US 6,637,902 B2

(12) United States Patent
Ishigami

(10) Patent No.: US 6,637,902 B2
(45) Date of Patent: Oct. 28, 2003

(54) MIRROR ANGLE ADJUSTMENT MECHANISM

(75) Inventor: Narumi Ishigami, Niwa-gun (JP)

(73) Assignee: Kabushiki Kaisha Tokai-Rika-Denki-Seisakusho (JP)

(*) Notice: Subject to any disclaimer, the term of this patent is extended or adjusted under 35 U.S.C. 154(b) by 3 days.

(21) Appl. No.: 10/098,621

(22) Filed: Mar. 18, 2002

(65) Prior Publication Data

US 2002/0149865 A1 Oct. 17, 2002

(30) Foreign Application Priority Data

Mar. 19, 2001 (JP) ........................................ 2001-079503
Jun. 1, 2001 (JP) ........................................ 2001-166707

(51) Int. Cl.[7] .............................................. G02B 7/182
(52) U.S. Cl. .......................... 359/876; 359/871; 359/872
(58) Field of Search ................................ 359/876, 872, 359/871, 877; 248/479

(56) References Cited

U.S. PATENT DOCUMENTS 5,539,584 A * 7/1996 Perry et al. .................. 359/874
5,946,151 A * 8/1999 Levko ......................... 359/872
6,168,279 B1 * 1/2001 Schnell ....................... 359/872

* cited by examiner

Primary Examiner—Audrey Chang
Assistant Examiner—Denise S. Allen
(74) Attorney, Agent, or Firm—Nixon Peabody LLP; Thomas W. Cole

(57) ABSTRACT

A mirror angle adjustment mechanism assembled by engaging latching members of a support pivot, which have been in the state inserted through openings provided in a second hemisphere portion of a mirror holder inner, with a case pivot. A plurality of elastic plates on the support pivot are compressed against the second hemisphere portion such that the second hemisphere portion is held between the plurality of elastic plates and a first hemisphere portion provided at the case pivot. Since this mirror angle adjustment mechanism requires only three parts, the case pivot, the mirror holder inner and the support pivot, the number of parts can be reduced and ease-of-assembly can be improved.

20 Claims, 7 Drawing Sheets

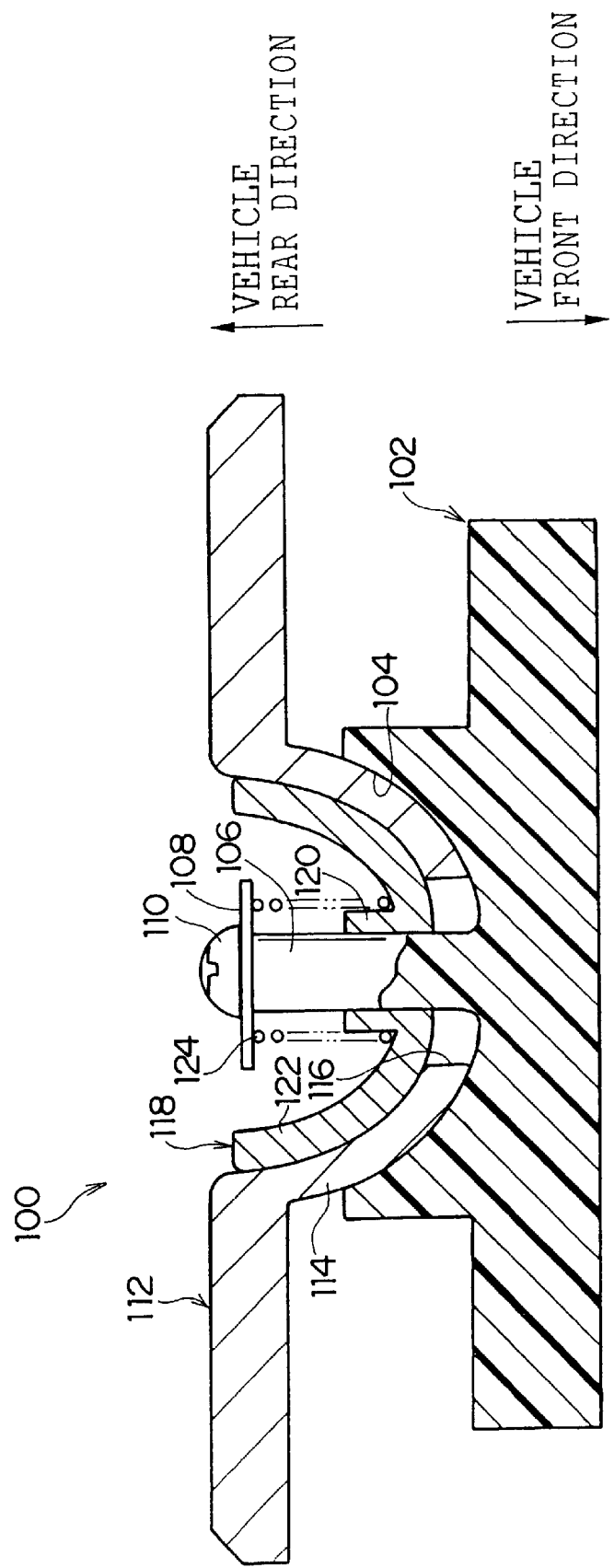

MIRROR ANGLE ADJUSTMENT MECHANISM

BACKGROUND OF THE INVENTION

1. Field of the Invention

The present invention relates to a mirror angle adjustment mechanism for adjusting a mirror surface angle of a mirror for visually observing rearward of a vehicle.

2. Description of the Related Art

For example, as shown in FIG. 7, a mirror angle adjustment mechanism 100 features a case pivot 102, with a first hemisphere portion 104 having a substantially hemisphere surface formed in the case pivot 102. A substantially cylindrical pivot shaft 106 is formed upright in the central portion of the first hemisphere portion 104 with a self-tapping screw 110 screwed on the tip end of the pivot shaft 106 via a snap ring 108.

A mirror holder inner 112 is disposed in the vehicle rearward side of the case pivot 102 mounted to the vehicle, with a second hemisphere portion 114 having a substantially hemisphere surface formed in the mirror holder inner 112. A circular opening 116 is formed on the case pivot 102 side of the second hemisphere portion 114. The second hemisphere portion 114 is fitted in the first hemisphere portion 104 with the pivot shaft 106 being inserted through the opening 116. Moreover, a mirror for visually observing rearward of the vehicle (not shown) is mounted on the mirror holder inner 112.

In the second hemisphere portion 114, a support pivot 118 is disposed. In the support pivot 118, a cylindrical pivot cylinder 120 is provided, and the pivot cylinder 120 is fitted on the pivot shaft 106. A third hemisphere portion 122 having a substantially hemisphere surface is provided around the pivot cylinder 120, and the third hemisphere portion 122 is fitted in the second hemisphere portion 114.

A compression coil spring 124 is mounted between the third hemisphere portion 122 and the snap ring 108. Thus, a pressuring force is applied to the third hemisphere portion 122 such that the second hemisphere portion 114 is held between the first hemisphere portion 104 and the third hemisphere portion 122.

Therefore, with the mirror angle adjustment mechanism 100, when a tilting force is applied manually to the mirror, the second hemisphere portion 114 is slid with respect to the first hemisphere portion 104 and the third hemisphere portion 122, and the mirror holder inner 112 is tilted so as to adjust the mirror surface angle of the mirror. However, since a friction force is present between the second hemisphere portion 114 and the first hemisphere portion 104 and the third hemisphere portion 122, resisting force can be obtained against tilting of the mirror holder inner 112, so that undesired movements of the mirror can be prevented.

However, according to the mirror angle adjustment mechanism 100, even in a case of providing the snap ring 108 and the self-tapping screw 110 as a single component, at least five parts, that is, the case pivot 102, the self-tapping screw 110, the mirror holder inner 112, the support pivot 118 and the compression coil spring 124 are needed. Therefore, problems are involved in that the number of the parts is large and ease-of-assembly is poor.

Moreover, the pressuring force of the compression coil spring 124 urges only on a central portion of the third hemisphere portion 122, and the pressuring force is not efficiently applied to portions away from the central portion of the second hemisphere portion 114. Furthermore, since the second hemisphere portion 114 and the third hemisphere portion 122 are both formed in a substantially hemisphere form, they can easily be point-contacted due to a slight formation error such as a dent, so that the friction force therebetween may not be obtained sufficiently. Therefore, a problem is involved in that inconvenient (that is, undesired) tilting of the mirror cannot be prohibited since the resisting force against tilting of the mirror holder inner 112 cannot be obtained sufficiently unless the pressuring force of the compression coil spring 124 is large.

SUMMARY OF THE INVENTION

In consideration of the above-mentioned facts, an object of the present invention is to provide a mirror angle adjustment mechanism capable of reducing the number of parts and improving of ease-of-assembly.

According to one aspect of the present invention, there is provided a mirror angle adjustment mechanism comprising: a case member including a first hemisphere portion in which a substantially hemispherical surface is formed; a mirror mounting member including a second hemisphere portion, on which a substantially hemispherical surface is formed which slidably fits into the first hemisphere portion and in which an opening is formed; and a lock member for holding the second hemisphere portion of the mirror mounting member between the lock member and the first hemisphere portion of the case member, the lock member including: at least one latching member inserted through the opening of the mirror mounting member and engaging with the case member when the lock member holds the second hemisphere portion of the mirror mounting member between the lock member and the first hemisphere portion of the case member; and a plurality of resilient plates which are deflected when the at least one latching member and the case member are engaged, and press the second hemisphere portion of the mirror mounting member against the first hemisphere portion of the case member.

In the mirror angle adjustment mechanism of the present invention, the latching member of the lock member is inserted through the opening provided in the second hemisphere portion of the mounting member and engaged with the case member. The plurality of elastic plates of the lock member are in a compressed state and urge against the second hemisphere portion such that the second hemisphere portion is held between the plurality of elastic plates and the first hemisphere portion of the case member. By pressuring different portions of the second hemisphere portion with the plurality of elastic plates, the entirety of the second hemisphere portion can be urged.

Therefore, when a tilting force is applied to the mirror mounted on the mounting member by a hand, or the like, the second hemisphere portion is slid against the first hemisphere portion and the plurality of elastic plates such that the mounting member is tilted so as to adjust the mirror surface angle of the mirror. However, since friction force is generated between the second hemisphere portion and both the first hemisphere portion and the plurality of elastic plates, a resisting force can be obtained against tilt of the mounting member. Thus, undesired tilting of the mirror can be inhibited.

Moreover, the mirror angle adjustment mechanism can be assembled with the case member by inserting the latching member of the lock member through the opening of the mounting member, with the second hemisphere portion of the mounting member being superimposed with the first hemisphere portion, so as to engage the latch member with the case member.

Accordingly, since the mirror angle adjustment mechanism has only three members, the case member, the mounting member and the lock member, the number of parts can be reduced and ease-of-assembly can be improved.

Furthermore, the elastic force of the plurality of elastic plates is applied directly on portions away from the central portion of the second hemisphere portion. Moreover, since the plurality of elastic plates is contacted with the second hemisphere portion, they tend to be surface-contacted. Therefore, a resisting force against tilt of the mounting member can be obtained efficiently, and thereby, inadvertent tilting of the mirror can be reliably inhibited.

According to the mirror angle adjustment mechanism of the present invention, the latching member may have rigidity. A load may be applied on the engaging portion of the latching member and the case member at a time of detaching the mirror from the mounting member or the like. By providing the latching member with rigidity, breakage of the latching member can be prevented.

Moreover, according to the mirror angle adjustment mechanism of the present invention, the latching member may include a projecting portion, and the case member may include an engaging hole portion formed to correspond to the latching member for engaging with the latching member. Furthermore, the case member includes, at the engaging hole portion, an engaging portion engaging with the projecting portion of the latching member, for engaging the latching member with the case member, and a non-engaging portion adjacent to the engaging portion and arranged such that the projecting portion of the latching member is insertable into the engaging hole portion at the non-engaging portion without engaging with the non-engaging portion.

According to this configuration, when the latching member is disposed opposing the engaging portion provided for the engaging hole of the case member (provided facing thereto), the projecting portion of the latching member is engaged with the engaging portion such that the latching member is in the state of being engaged with the case member. In contrast, when the latching member is disposed opposing the non-engaging portion provided in the engaging hole adjacent to the engaging portion, the projecting portion of the latching member is not engaged with the non-engaging portion and the latching member is not engaged with the case member.

Therefore, by disposing the latching member opposing the engaging portion by disposing the latching member opposing the non-engaging portion and then relatively moving the lock member with respect to the case member, the latching member can be engaged with the case member without deflecting the latching member. Thus, even if the latching member does not have elasticity, the latching member can be engaged with the case member without breakage of the latching member.

In the above-mentioned aspect of the present invention, the case member may comprise a resilient pawl-form portion at the engaging hole portion, the pawl-form portion being deflectable for allowing relative movement of the latching member from the non-engaging portion side to the engaging portion side after the latching member has been inserted into the engaging hole portion, and being engageable with the latching member for obstructing relative movement of the latching member from the engaging portion side to the non-engaging portion side.

According to this configuration, since the movement of the latching member from the non-engaging portion to the engaging portion can be enabled by the deflection of the elastic nail provided in the engaging hole, the latching member can be engaged with the case member without deflecting the latching member. On the other hand, since the movement of the latching member from the engaging portion to the non-engaging portion can be inhibited by the elastic nail obstructing the latching member, movement of the latching member from the engaging portion to the non-engaging portion by vibrations or the like can be inhibited. Thus, inadvertent release of the engagement of the latching member with the case member can be prevented.

BRIEF DESCRIPTION OF THE DRAWINGS

FIG. 7 is a cross-sectional view showing a conventional mirror angle adjustment mechanism.

DETAILED DESCRIPTION OF THE PREFERRED EMBODIMENT

[First Embodiment]

Figure 1:
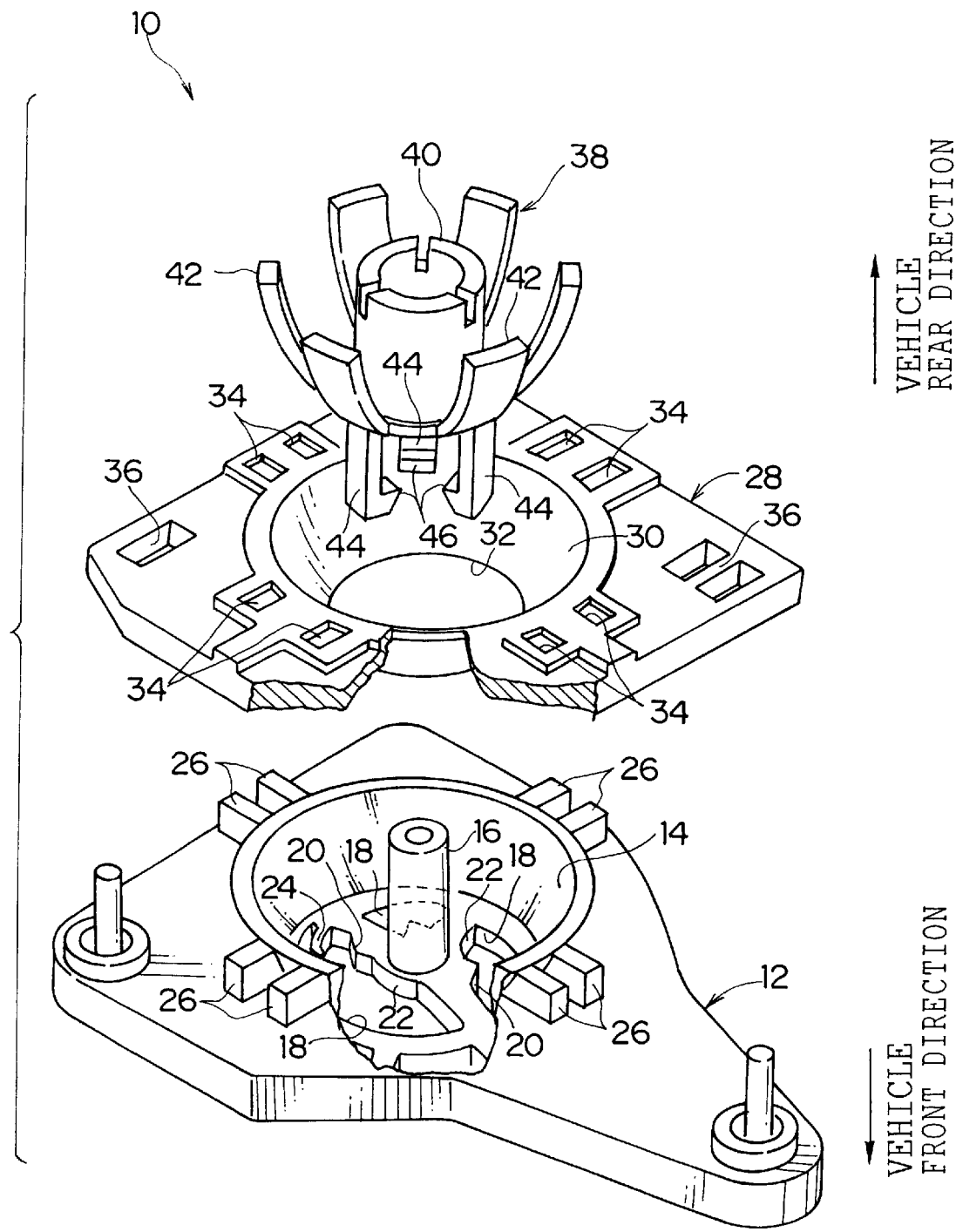
FIG. 1 is an exploded perspective view showing a mirror angle adjustment mechanism according to a first embodiment of the present invention.

FIG. 1 is an exploded perspective view of a mirror angle adjustment mechanism 10 according to the first embodiment of the present invention.

The mirror angle adjustment mechanism 10 according to this embodiment is to be employed with a door mirror device for a vehicle. The mirror angle adjustment mechanism 10 includes a case pivot 12 serving as a case member. The case pivot 12 is interlocked with the vehicle door via a frame, a stowing mechanism, and a door mirror stay (not shown).

On the case pivot 12, a first hemisphere portion 14 having a substantially hemisphere surface is formed. At a central portion of the first hemisphere portion 14, a substantially cylindrical pivot shaft 16 is provided upright. In the first hemisphere portion 14, an appropriate number (in this embodiment, three) of engaging holes 18 are formed around the pivot shaft 16 (in a bottom surface of the first hemisphere portion 14). The engaging holes 18 are disposed along a circumferential direction of the first hemisphere portion 14

(pivot shaft 16) at equal intervals, and are curved along the circumferential direction of the first hemisphere portion 14.

Figure 2:
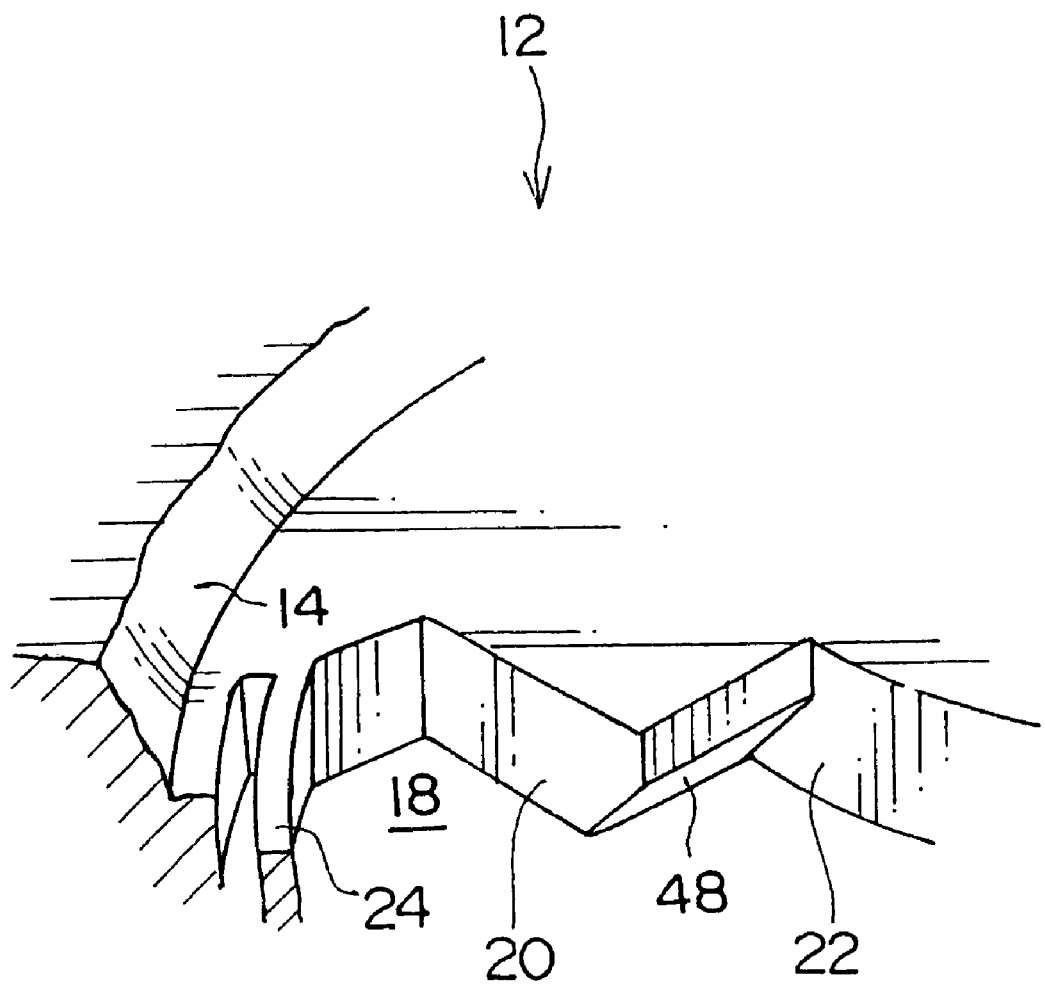
FIG. 2 is a perspective view showing in detail a tilted surface provided in an engaging hole according to the first embodiment of the present invention.

On an inner wall of each engaging hole, an engaging portion 20 is formed at one side and a non-engaging portion 22 is formed at an other side. The engaging portion 20 and the non-engaging portion 22 are provided adjacent to each other. The engaging portion 20 is projected further outward from the pivot shaft 16 than the non-engaging portion 22. As shown in FIG. 2, a tilted surface 48 is formed in a part of the engaging portion 20 that is adjacent to the non-engaging portion 22. The tilted surface 48 is tilted toward the vehicle rear direction from the engaging portion 20 to the non-engaging portion 22.

Figure 3:
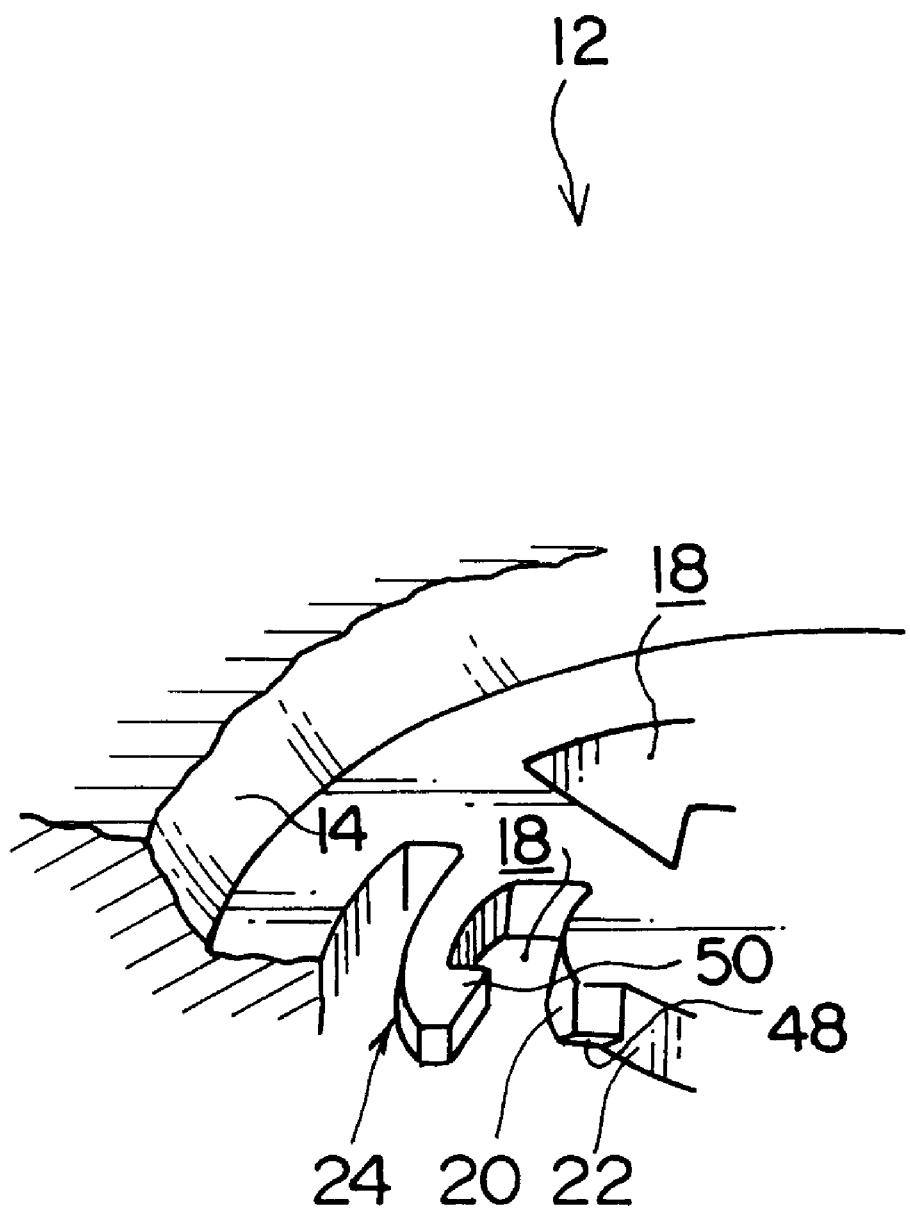
FIG. 3 is a perspective view showing in detail a resilient pawl according to the first embodiment of the present invention.

Each engaging hole 18 is provided with a resilient pawl 24 having elasticity. The elastic nail 24 faces to the engaging portion 20. As shown in detail in FIG. 3, a projecting portion 50 is formed on a distal end of the elastic nail 24. The projecting portion 50 projects toward an engaging portion 20 side. The projecting portion 50 has a triangular shape in a plan view. An elastic nail 24 proximal end side surface of the projecting portion 50 is provided perpendicularly with respect to a longitudinal direction of the elastic nail 24, and an elastic nail 24 distal end side surface of the projecting portion 50 is provided as a tilted surface extending gradually away from the engaging portion 20 toward a distal end portion of the elastic nail 24.

In the vicinity of the first hemisphere portion 14, a predetermined number of pairs of guiding projections 26 are provided (in this embodiment, a total of four pairs, on vehicle upper, lower, right left sides of the first hemisphere portion 14). The pairs of guiding projections 26 are disposed at equal intervals in the circumferential direction of the first hemisphere portion 14.

On a vehicle rear side of the case pivot 12, a substantially rectangular plate-like mirror holder inner 28 is disposed to serve as a mounting member. At a central portion of the mirror holder inner 28, a second hemisphere portion 30 having a substantially hemisphere surface is formed. On a case pivot 12 side of the second hemisphere portion 30, a circular opening 32 is formed. The second hemisphere portion 30 is fitted into the first hemisphere portion 14 with the pivot shaft 16 being inserted through the opening 32. Thus, by sliding the second hemisphere portion 30 along the first hemisphere portion 14, tilting of the mirror holder inner 28 with respect to the case pivot 12 can be enabled.

In the vicinity of the second hemisphere portion 30, a predetermined number of pairs of guiding holes 34 (in this embodiment, a total of four pairs, on vehicle upper, lower, right and left both sides of the vehicle of the second hemisphere portion 30) are provided. The pairs of guiding holes 34 are disposed in at equal intervals the circumferential direction of the second hemisphere portion 30, corresponding to the guiding projections 26 so as to be entered by each pair of the guiding projections 26. Thus, tilt of the mirror holder inner 28 can be guided with respect to the case pivot 12 while rotation of the mirror holder inner 28 in the pivot shaft 16 circumferential direction with respect to the case pivot 12 is inhibited.

In each of corner portions of the mirror holder inner 28, a mounting portion 36 is formed. Furthermore, on the vehicle rear side of the mirror holder inner 28, a mirror for visually observing behind the vehicle (not shown) is provided, and a predetermined number of mounting pawls (not shown) are provided on the mirror holder inner 28 side of the mirror. Each mounting pawl corresponds to one of the mounting portions 36. By mounting the mounting pawls on the mounting portions 36, the mirror is mounted on the mirror holder inner 28.

In the second hemisphere portion 30 of the mirror holder inner 28, a support pivot 38 is disposed as a lock member. The support pivot 38 is provided with a cylindrical pivot cylinder 40. The pivot cylinder 40 is fitted in the above-mentioned pivot shaft 16.

A plurality (in this embodiment, six) of resilient plates 42 are provided around the pivot cylinder 40 at equal intervals along the circumferential direction of the second hemisphere portion 30. The resilient plates 42 have elasticity and are formed in a curved plate-like shape. In a state free of application of forces, the radius of curvature of each elastic plate 42 is larger than the radius of curvature of the inner circumferential surface of the second hemisphere portion 30.

A predetermined number of (in this embodiment, three) latching members 44 having rigidity (i.e., substantially not having elasticity) are provided below the pivot cylinder 40. The latching members 44 are projected to the case pivot 12 side. Distal ends of the latching members 44 are projected perpendicularly inward forward the pivot cylinder 40 with respect to other portions thereof so as to form projecting portions 46.

Figure 4A:
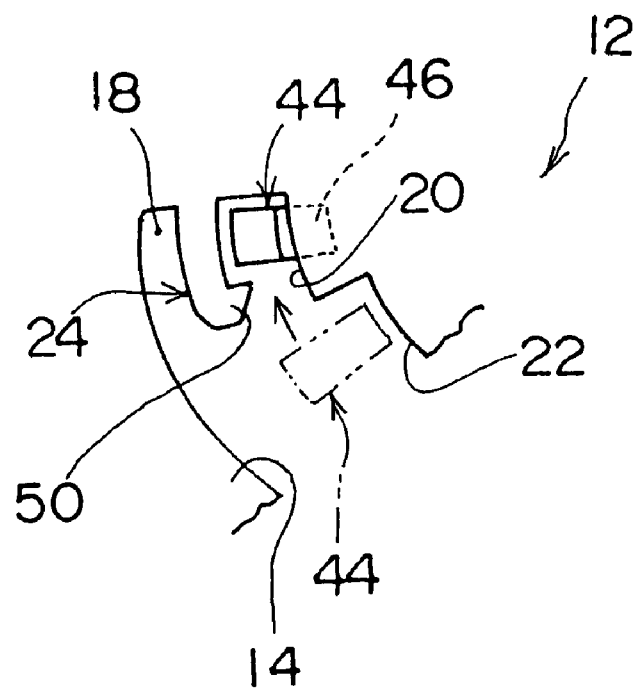
FIG. 4A is a plan view showing an operation of moving a latching member from a non-engaging portion of an engaging hole to an engaging portion in the first embodiment of the present invention.
Figure 4B:
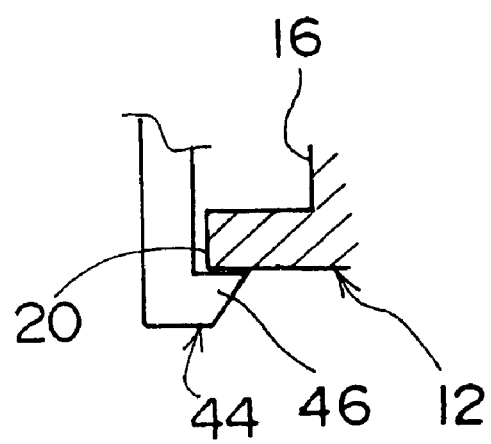
FIG. 4B is a cross-sectional view showing a state with a projecting portion of the latching member engaged with the engaging portion of the engaging hole in the first embodiment of the present invention.

The latching members 44 are disposed at equal intervals in the circumferential direction of the pivot cylinder 40, corresponding to the above-mentioned engaging holes 18, such that each latching member 44 is disposed facing the engaging portion 20 of each engaging hole 18. As shown in FIG. 4B, the projecting portion 46 of each latching member 44 is engaged with one of the engaging portion 20 so that the support pivot 38 and the case pivot 12 are in an engaged state. Thus, the above-mentioned resilient plates 42 are contacted with the second hemisphere portion 30 in a compressed state, the projecting portion 46 of the latching member 44 is urged against the engaging portion 20 by the elastic force and stopped, and an elastic force is applied on the second hemisphere portion 30 toward the first hemisphere portion 14 side thereof so that the second hemisphere portion 30 is held between the first hemisphere portion 14 and the plurality of resilient plates 42.

The latching members 44 are disposed between the engaging portions 20 and the above-mentioned resilient pawls 24. By stopping each latching member 44 with the projecting portion 50 of the elastic nail 24 (the surface at the elastic nail 24 proximal end side of the projecting portion 50), movement (rotation) of each latching member 44 from the engaging portion 20 of the engaging hole 18 to the non-engaging portion 22 can be inhibited.

Moreover, when the latching members 44 are disposed facing the non-engaging portions 22, the projecting portions 46 of the latching members 44 are not engaged with the non-engaging portions 22, so that the support pivot 38 is not engaged with the case pivot 12. Furthermore, as shown in FIG. 4A, when each latching member 44 is moved (rotated) from the non-engaging portion 22 to the engaging portion 20 side, movement of the latching member 44 from the non-engaging portion 22 to the engaging portion 20 is allowed by deflection of the elastic nail 24 due to the latching member 44 pressuring a distal end side surface of the elastic nail 24 of the projecting portion 50.

Next, the operation of this embodiment will be explained.

According to the mirror angle adjustment mechanism 10 of the above-mentioned configuration, by engaging the latching members 44 of the support pivot 38 inserted through the opening 32 in the second hemisphere portion 30 of the mirror holder inner 28 with the case pivot 12, the plurality of resilient plates 42 of the support pivot 38 in the compressed state are fitted into the second hemisphere portion 30 such that the second hemisphere portion 30 is held between the plurality of resilient plates 42 and the first hemisphere portion 14 of the case pivot 12.

Therefore, when a tilting force is applied manually to the mirror mounted on the mirror holder inner 28, the second hemisphere portion 30 is slid against the first hemisphere portion 14 and the plurality of resilient plates 42 so as to tilt the mirror holder inner 28 for adjusting the mirror surface angle. However, since a friction force is generated between the second hemisphere portion 30 and the first hemisphere portion 14 and the plurality of resilient plates 42, a resisting force against tilting of the mirror holder inner 28 is provided. Thus, undesired tilting of the mirror can be inhibited.

Moreover, when the latching members 44 are disposed facing the engaging portions 20 provided in the engaging holes 18 of the case pivot 12, the projecting portions 46 of the latching members 44 are engaged with the engaging portions 20 so that the latching members 44 are engaged with the case pivot 12. In contrast, when the latching members 44 are disposed facing the non-engaging portions 22 provided adjacent to the engaging portions 20 in the engaging holes 18, the projecting portions 46 of the latching members 44 are not engaged with the non-engaging portions 22, and the latching members 44 are not engaged with the case pivot 12.

Therefore, for assembling the mirror angle adjustment mechanism 10, first, the second hemisphere portion 30 of the mirror holder inner 28 is superimposed on the first hemisphere portion 14 of the case pivot 12, and the latching members 44 of the support pivot 38 are inserted through the opening 32 of the mirror holder inner 28 so as to be inserted at positions facing the non-engaging portions 22 of the engaging holes 18 such that the latching members 44 are disposed at the non-engaging portions 22. Thereafter, by rotating the support pivot 38 in a direction from the non-engaging portions 22 to the engaging portions 20, the latching members 44 are disposed at the engaging portions 20 by guiding the projecting portions 46 of the latching members 44 along the tilted surfaces 48 so as to engage the projecting portions 46 with the engaging portions 20. Thus, even though the latching members 44 are not deflected, the latching members 44 can be engaged with the case pivot 12 and the mirror angle adjustment mechanism 10 can be assembled easily.

Accordingly, since the mirror angle adjustment mechanism 10 comprises only three parts, the case pivot 12, the mirror holder inner 28 and the support pivot 38, the number of parts can be reduced as well as ease-of-assembly being improved.

Moreover, as mentioned above, since the latching member 44 can be engaged with the case pivot 12 even though the latching member 44 is not deflected, the latching member 44 can be engaged with the case pivot 12 without breakage of the latching member 44 even if the latching member 44 does not have elasticity, as in this embodiment.

Furthermore, since movement of the latching member 44 from the non-engaging portion 22 to the engaging portion 20 is enabled by deflection of the elastic nail 24 provided in the engaging hole 18, the latching member 44 can be engaged with the case pivot 12 even though the latching member 44 is not deflected. Also, since movement of the latching member 44 from the engaging portion 20 to the non-engaging portion 22 is inhibited by blocking the latching member 44 with the elastic nail 24, movement (rotation) of the latching member 44 from the engaging portion 20 to the non-engaging portion 22 by vibrations, or the like can be inhibited. Thus, inadvertent release of the engagement of the latching member 44 with the case pivot 12 can be prevented.

Here, the latching member 44 is made of a material having rigidity in consideration of a load that will be applied to the engaging portion of the latching member 44 and the case pivot 12 at a time of detaching the mirror from the mirror holder inner 28, or the like. Thus, breakage of the latching member 44 can be prevented.

Furthermore, the elastic force of the plurality of resilient plates 42 is applied directly to portions apart from the central portion of the second hemisphere portion 30. Moreover, since the plurality of resilient plates 42 are contacted with the second hemisphere portion 30, they are likely to surface-contacted. Therefore, resisting force against tilting of the mirror holder inner 28 can be obtained efficiently, and thus, uncontrollable tilting of the mirror can be reliably inhibited.

Moreover, since the plurality of resilient plates 42 are provided at equal intervals along the circumferential direction of the second hemisphere portion 30 (pivot shaft 16), the resisting force against tilt of the mirror holder inner 28, and of the mirror, can be obtained substantially uniformly in the circumferential direction of the pivot shaft 16.

[Second Embodiment]

Figure 5:
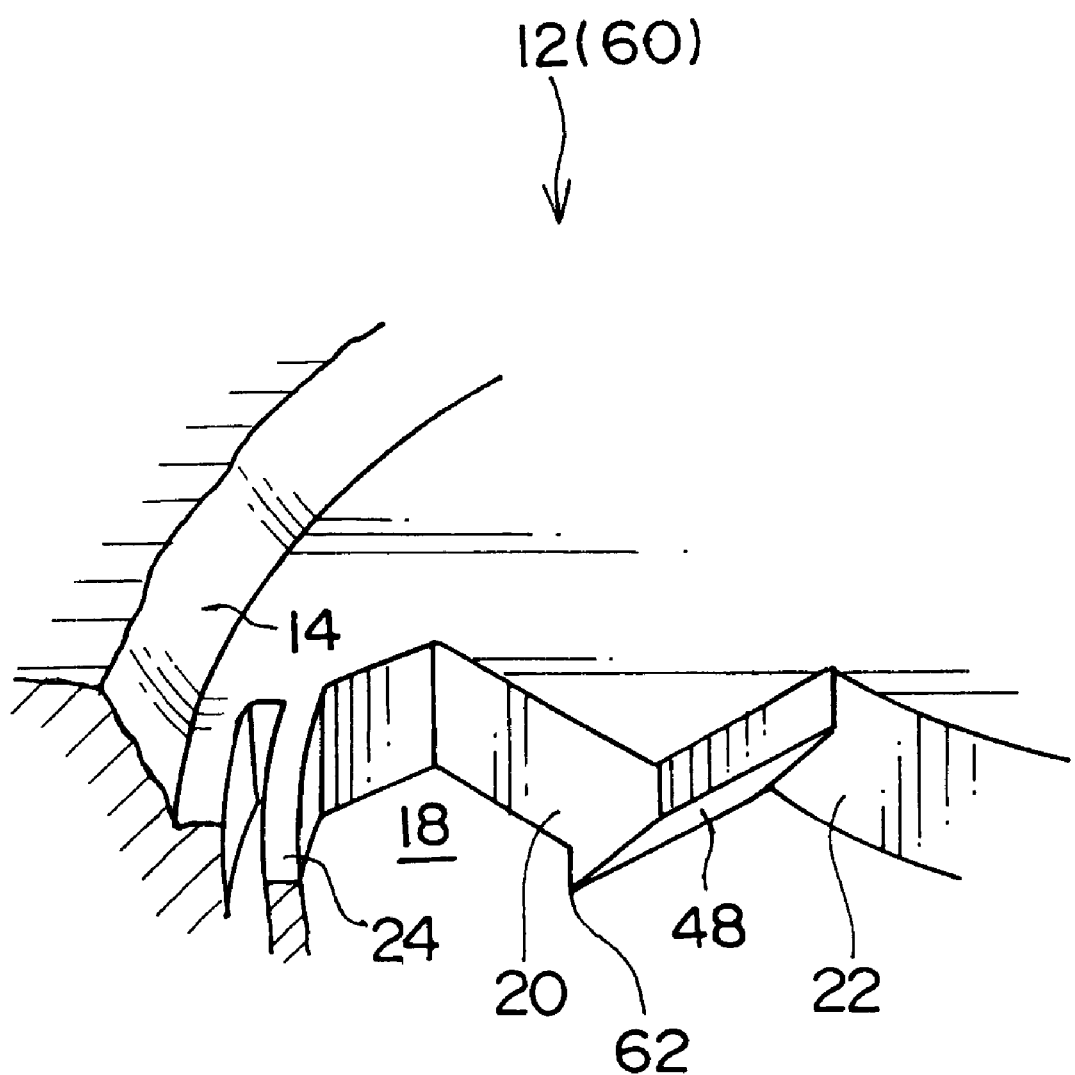
FIG. 5 is a perspective view showing in detail a tilted surface and a projection provided in the engaging hole according to a second embodiment of the present invention.
Figure 6A:
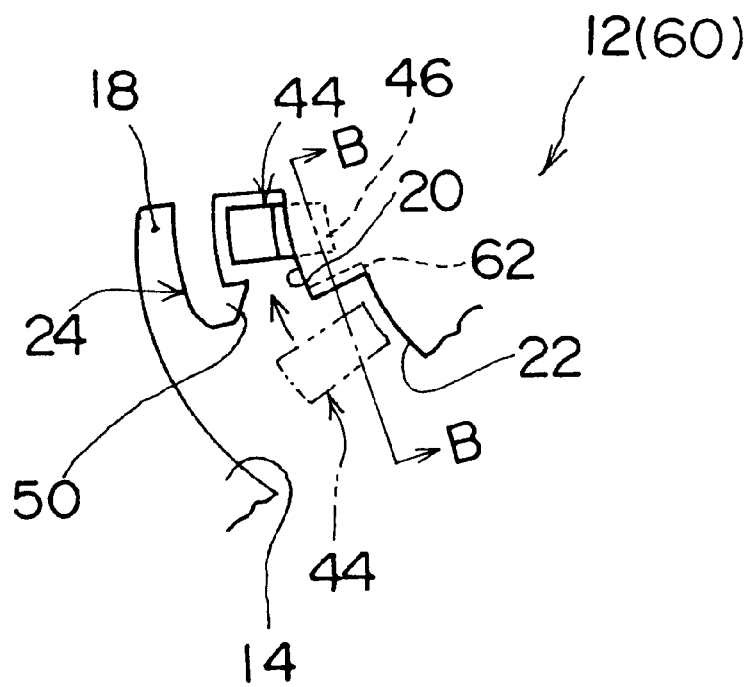
FIG. 6A is a plan view showing an operation of moving a latching member from a non-engaging portion of an engaging hole to an engaging portion in the second embodiment of the present invention.
Figure 6B:
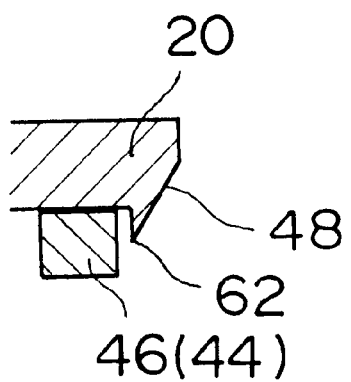
FIG. 6B is a cross-sectional view, cross-sectional view taken on the line B—B of FIG. 6A, showing a state with a projecting portion of the latching member engaged with the engaging portion of the engaging hole in the second embodiment of the present invention.

FIG. 5 is a perspective view showing a main part of a mirror angle adjustment mechanism 60 according to a second embodiment of the present invention. FIG. 6A is a plan view showing the main part of the mirror angle adjustment mechanism 60, and FIG. 6B is a cross-sectional view of the main part of the mirror angle adjustment mechanism 60 (cross-sectional view taken on the line B—B of FIG. 6A).

The mirror angle adjustment mechanism 60 according to this embodiment has substantially the same configuration as that of the mirror angle adjustment mechanism 10 according to the above-mentioned first embodiment, but differs therefrom in the following points.

A projection 62 is provided on a surface of each engaging portion 20 of the case pivot 12 which surface is contacted with the projecting portion 46 of the latching member 44 for stopping the same, that is, the rear surface of each engaging portion 20. The projection 62 is projected to the forward of the vehicle and is disposed at a portion of the engaging portion 20 adjacent to the non-engaging portion 22. The projection 62 has a triangular shape in side view, and has a tilted surface with the projection height thereof reducing in the direction from the engaging portion toward the non-engaging portion. That is, the surface of the projection 62 on the non-engaging portion 22 side thereof is tilted toward a distal tip of projection 62 from the non-engaging portion 22 to the engaging portion 20. In this embodiment, this surface is formed continuously with the tilted surface 48. A surface of the projection 62 on the engaging portion 20 side thereof is perpendicular to the rear surface of the engaging portion 20, and is substantially perpendicular to the direction from the engaging portion side toward the non-engaging portion side.

By retaining each latching member 44 of the support pivot 38 disposed between the engaging portion 20 and the elastic nail 24 with the projecting portion 50 of the elastic nail 24 (i.e., the surface of the projecting portion 50 on the elastic nail 24 proximal end side thereof, and the projection 62 (i.e., surface of the projection 62 on the engaging portion 20 side thereof), movement (rotation) of the each latching member 44 from the engaging portion 20 to the non-engaging portion 22 can be further inhibited.

In contrast, when moving (rotating) the latching member 44 from the non-engaging portion 22 to the engaging portion 20 side, movement of the latching member 44 from the non-engaging portion 22 to the engaging portion 20 is allowed by moving the projecting portion 46 of the latching member 44 over the projection 62 of the projecting portion 46, guided by the inclined surface 48 and the projection 62 (i.e., the surface of the projection 62 on the non-engaging portion 22 side thereof and pressuring the surface on the elastic nail 24 distal end side of the projecting portion 50 provided on the elastic nail 24 with the latching member 44 so as to deform the elastic nail 24.

Accordingly, in the mirror angle adjustment mechanism 60 of this embodiment, the same effects as with the mirror angle adjustment mechanism 10 of the above-mentioned first embodiment can be obtained.

Furthermore, when moving (rotating) the latching member 44 from the non-engaging portion 22 to the engaging portion 20 side, the projecting portion 46 of the latching member 44 can be moved over the projection 62 by compressing the plurality of resilient plates 42 of the support pivot 38. Therefore, even though the latching member 44 is not deflected, the latching member 44 can be engaged with the case pivot 12. Thus, even if the latching member 44 does not have elasticity, as in this embodiment, the latching member 44 can be engaged with the case pivot 12 while avoiding breakage of the latching member 44.

Also, since movement of the latching member 44 from the engaging portion 20 to the non-engaging portion 22 is further inhibited by stopping the projecting portion 46 of the latching member 44 with the projection 62, movement (rotation) of the latching member 44 from the engaging portion 20 to the non-engaging portion 22 by vibration or the like is further be inhibited. Thus, inadvertent release of the engagement of the latching member 44 with the case pivot 12 is further prevented.

Although the elastic nail 24 and the projection 62 are both provided in the engaging hole 18 of the case pivot 12 in the above-mentioned second embodiment, only the projection may be provided alone in the engaging hole of the case pivot (case member).

Furthermore, although the mirror angle adjustment mechanism of the present invention is for use in a door mirror device for a vehicle in the above-mentioned first and second embodiments, the mirror angle adjustment mechanism of the present invention may also be used in a fender mirror device for a vehicle, or the like.

Since the mirror angle adjustment mechanism of the present invention comprises only three parts (the case member, the mounting member and the lock member), the number of parts is reduced as well as ease-of-assembly being improved.

Moreover, since each latching member can be provided with rigidity, breakage of the latching member due to external stresses applied inadvertently to the mirror angle adjustment mechanism can be prevented.

Furthermore, since the latching member can be stopped on the case member by engaging the projecting portion with the engaging portion of the engaging hole, even if the latching member does not have elasticity (flexibility), the latching member and the case member can be engaged without breakage of the latching member.

Moreover, since movement of the latching member from the non-engaging portion of the engaging hole to the engaging portion can be enabled by deflecting the elastic nail, the latching member can be engaged with the case member without deflecting the latching member. Conversely, since movement of the latching member from the engaging portion to the non-engaging portion can be inhibited by stopping the latching member with the elastic nail, inadvertent release of the engagement of the latching member with the case member can be prevented.

What is claimed is:

1. A mirror angle adjustment mechanism comprising:
   a case member including a first hemisphere portion in which a substantially hemispherical surface is formed;
   a mirror mounting member including a second hemisphere portion, on which a substantially hemispherical surface is formed which slidably fits into the first hemisphere portion and in which an opening is formed; and
   a lock member for holding the second hemisphere portion of the mirror mounting member between the lock member and the first hemisphere portion of the case member, the lock member including:
      at least one latching member inserted through the opening of the mirror mounting member and engaging with the case member when the lock member holds the second hemisphere portion of the mirror mounting member between the lock member and the first hemisphere portion of the case member; and
      a plurality of resilient plates which are deflected when the at least one latching member and the case member are engaged, and press the second hemisphere portion of the mirror mounting member against the first hemisphere portion of the case member.

2. The mirror angle adjustment mechanism of claim 1, wherein the latching member is substantially rigid.

3. The mirror angle adjustment mechanism of claim 1, wherein the latching member includes a projecting portion, the case member includes at least an engaging hole portion formed to correspond to the latching member for engaging with the latching member, and the case member includes, at the engaging hole portion, an engaging portion engaging with the projecting portion of the latching member, for engaging the latching member with the case member, and a non-engaging portion adjacent to the engaging portion and arranged such that the projecting portion of the latching member is insertable into the engaging hole portion at the non-engaging portion without engaging with the non-engaging portion.

4. The mirror angle adjustment mechanism of claim 2, wherein the latching member includes a projecting portion, the case member includes at least an engaging hole portion formed to correspond to the latching member for engaging with the latching member, and the case member includes, at the engaging hole portion, an engaging portion engaging with the projecting portion of the latching member, for engaging the latching member with the case member, and a non-engaging portion adjacent to the engaging portion and arranged such that the projecting portion of the latching member is insertable into the engaging hole portion at the non-engaging portion without engaging with the non-engaging portion.

5. The mirror angle adjustment mechanism of claim 3, wherein the case member comprises a resilient pawl-form portion at the engaging hole portion, the pawl-form portion being deflectable for allowing relative movement of the latching member from the non-engaging portion side to the engaging portion side after the latching member has been inserted into the engaging hole portion, and being engageable with the latching member for obstructing relative movement of the latching member from the engaging portion side to the non-engaging portion side.

6. The mirror angle adjustment mechanism of claim 4, wherein the case member comprises a resilient pawl-form portion at the engaging hole portion, the pawl-form portion being deflectable for allowing relative movement of the latching member from the non-engaging portion side to the engaging portion side after the latching member has been inserted into the engaging hole portion, and being engageable with the latching member for obstructing relative movement of the latching member from the engaging portion side to the non-engaging portion side.

7. The mirror angle adjustment mechanism of claim 3, wherein the engaging portion comprises, at a region adjacent to the non-engaging portion, an inclined surface for guiding relative movement of the projecting portion of the latching member from the non-engaging portion to the engaging portion.

8. The mirror angle adjustment mechanism of claim 4, wherein the engaging portion comprises, at a region adjacent to the non-engaging portion, an inclined surface for guiding relative movement of the projecting portion of the latching member from the non-engaging portion to the engaging portion.

9. The mirror angle adjustment mechanism of claim 7, wherein the engaging portion comprises: an engaging-contacting surface for contacting and engaging with the projecting portion of the latching member; and, at a region of the engaging-contacting surface adjacent to the non-engaging portion, a projection.

10. The mirror angle adjustment mechanism of claim 8, wherein the engaging portion comprises: an engaging-contacting surface for contacting and engaging with the projecting portion of the latching member; and, at a region of the engaging-contacting surface adjacent to the non-engaging portion, a projection.

11. The mirror angle adjustment mechanism of claim 9, wherein the projection of the engaging portion comprises, at an engaging portion side thereof, a surface which is substantially perpendicular to a direction from the engaging portion side to the non-engaging portion side.

12. The mirror angle adjustment mechanism of claim 10, wherein the projection of the engaging portion comprises, at an engaging portion side thereof, a surface which is substantially perpendicular to a direction from the engaging portion side to the non-engaging portion side.

13. The mirror angle adjustment mechanism of claim 1, wherein the mechanism is for use with a mirror for rearward visual observation from a vehicle, and the mirror mounting member includes mounting portions for receiving and supporting the mirror.

14. The mirror angle adjustment mechanism of claim 13, wherein the mechanism is for use with a vehicle including at least one of a fender portion and a door portion, and the mirror angle adjustment mechanism is adapted for mounting at one of the fender portion and the door portion of the vehicle.

15. The mirror angle adjustment mechanism of claim 1, wherein the resilient plates are arranged in a circumferential direction of the lock member at substantially equal intervals.

16. The mirror angle adjustment mechanism of claim 3, wherein the resilient plates are arranged in a circumferential direction of the lock member at substantially equal intervals.

17. The mirror angle adjustment mechanism of claim 1, wherein the number of latching members is greater than one, and the latching members are arranged in a circumferential direction of the lock member at substantially equal intervals.

18. The mirror angle adjustment mechanism of claim 3, wherein the number of latching members is greater than one, and the latching members are arranged in a circumferential direction of the lock member at substantially equal intervals.

19. The mirror angle adjustment mechanism of claim 17, wherein each latching member is relatively moved from the non-engaging portion to the engaging portion when the-lock member is rotated relative to the case member.

20. The mirror angle adjustment mechanism of claim 18, wherein each latching member is relatively moved from the non-engaging portion to the engaging portion when the lock member is rotated relative to the case member.

* * * * *